United States Patent
Uchikoshi et al.

(10) Patent No.: US 7,279,024 B2
(45) Date of Patent: Oct. 9, 2007

(54) HIGH PURITY COBALT, METHOD OF MANUFACTURING THEREOF, AND HIGH PURITY COBALT TARGETS

(75) Inventors: Masahito Uchikoshi, Miyagi (JP); Norio Yokoyama, Miyagi (JP); Tamas Kekesi, Miyagi (JP); Minoru Isshiki, c/o Minoru Isshiki, 3-2-14, Kazatori, Taihaku-ku, Sendi-shi, Miyagi (JP)

(73) Assignees: Sony Corporation, Tokyo (JP); Tamas Kekisi, Miyagi (JP); Minoru Isshiki, Miyagi (JP)

( * ) Notice: Subject to any disclaimer, the term of this patent is extended or adjusted under 35 U.S.C. 154(b) by 114 days.

(21) Appl. No.: 10/803,506

(22) Filed: Mar. 17, 2004

(65) Prior Publication Data
US 2007/0180953 A1    Aug. 9, 2007

Related U.S. Application Data

(62) Division of application No. 09/966,861, filed on Sep. 28, 2001, now Pat. No. 6,740,290.

(30) Foreign Application Priority Data
Sep. 29, 2000    (JP)    ............................ P2000-338288

(51) Int. Cl.
    C22B 23/00    (2006.01)
(52) U.S. Cl. .............................. 75/365; 75/369; 75/738
(58) Field of Classification Search .................. 75/626, 75/738
See application file for complete search history.

(56) References Cited

U.S. PATENT DOCUMENTS

| | | | | |
|---|---|---|---|---|
| 3,661,564 A | * | 5/1972 | Gandon et al. | 75/365 |
| 4,039,612 A | * | 8/1977 | Price et al. | 423/24 |
| 4,108,640 A | * | 8/1978 | Wallace et al. | 75/374 |
| 4,178,172 A | * | 12/1979 | Tiitinen et al. | 75/359 |
| 4,214,894 A | * | 7/1980 | Ritsko et al. | 75/365 |
| 4,214,896 A | * | 7/1980 | Cheresnowsky | 75/365 |

(Continued)

FOREIGN PATENT DOCUMENTS

JP    11260410    *    3/2001

*Primary Examiner*—George Wyszomierski
(74) *Attorney, Agent, or Firm*—Sonnenschein Nath & Rosenthal LLP

(57) ABSTRACT

High purity cobalt with a very few content of impurities such as copper, a method of manufacturing thereof, and high purity cobalt targets are provided. The cobalt containing impurities such as copper is dissolved in a hydrochloric acid solution, and the concentration of the hydrochloric acid of the aqueous solution of cobalt chloride is adjusted to 0.1 kmol/m³ to 3 kmol/m³. Then, cobalt is added in the aqueous solution of cobalt chloride, and an inert gas is injected into the solution with agitating, in order to convert the divalent copper ions contained in the aqueous solution of cobalt chloride to monovalent copper ions. Then, the aqueous solution of cobalt chloride is fed into a column filled up with the anion exchange resins. Cobalt is not absorbed on the anion exchange resins although the monovalent copper ions are absorbed on the anion exchange resins. Therefore, copper can be separated from the aqueous solution of cobalt chloride. And then, the aqueous solution of cobalt chloride is evaporated to dryness and heated to 623 K to 873 K in a hydrogen atmosphere to generate cobalt.

5 Claims, 8 Drawing Sheets

U.S. PATENT DOCUMENTS

| | | | |
|---|---|---|---|
| 4,218,240 A | * | 8/1980 | Gingerich et al. ............ 75/365 |
| 4,233,063 A | * | 11/1980 | Ritsko et al. ................. 75/374 |
| 4,381,937 A | * | 5/1983 | Gingerich et al. ............ 75/353 |
| 4,395,278 A | * | 7/1983 | Vanderpool et al. .......... 75/365 |
| 4,469,505 A | * | 9/1984 | Cheresnowsky et al. ...... 75/365 |
| 4,526,611 A | * | 7/1985 | Yoshizawa et al. ........... 75/347 |
| 4,578,251 A | * | 3/1986 | Ritsko et al. ................. 423/55 |
| 4,816,069 A | * | 3/1989 | Douglas et al. ............... 75/360 |
| 5,154,757 A | * | 10/1992 | Miller et al. .................. 75/365 |
| 5,667,665 A | * | 9/1997 | Shindo et al. ............... 205/589 |
| 5,728,197 A | * | 3/1998 | Seegopaul et al. ............ 75/710 |
| 5,810,983 A | * | 9/1998 | Shindo et al. ......... 204/298.13 |
| 6,346,137 B1 | * | 2/2002 | Hohne et al. ................. 75/374 |
| 6,740,290 B2 | * | 5/2004 | Uchikoshi et al. .......... 420/435 |
| 2002/0117025 A1 | * | 8/2002 | Uchikoshi et al. ............ 75/626 |

* cited by examiner

CONTINUED FROM FIG.1

S106
THE AQUEOUS SOLUTION OF COBALT CHLO-RIDE M IS EVAPORATED TO DRYNESS TO OBTAIN COBALT CHLORIDE OR HYDRATES THEREOF.

S107
THE COBALT CHLORIDE OR HYDRATES THEREOF ARE HEATED TO 623K TO LESS THAN 873K IN A HYDROGEN ATMOSPHERE TO OBTAIN COBALT.

S108
THE COBALT IS FUSED WITH PLASMA ARC CONTAINING ACTIVE HYDROGEN TO REMOVE IMPURITIES SUCH AS OXYGEN.

END

FIG.2

HIGH PURITY COBALT, METHOD OF MANUFACTURING THEREOF, AND HIGH PURITY COBALT TARGETS

RELATED APPLICATION DATA

The present application claims priority to Japanese Application No. P2000-338288 filed Sep. 29, 2000, and is a divisional of U.S. Application Ser. No. 09/966,861, filed Sep. 28, 2001, now U.S. Pat. No. 6,740,290, both of which are incorporated herein by reference to the extent permitted by law.

BACKGROUND OF THE INVENTION

1. Field of the Invention

The present invention relates to high purity cobalt in which a content of impurities such as copper is reduced, a method of manufacturing thereof, and high purity cobalt targets.

2. Description of the Related Art

Semiconductor devices such as VLSI (very large scale integrated circuit) and ULSI (ultra LSI), have a structure where various thin metal films are deposited on, for example, a silicon (Si) wafer. Although the idea of using cobalt (Co) as a wiring material has been considered in recent years, the accompanying injurious impurities in the cobalt may result in malfunction or deterioration of the semiconductor device, which is undesirable. For example, copper (Cu) may cause a short circuit because of high diffusion rate inside silicon, and radioactive elements such as uranium (U) and thorium (Th) will cause incorrect operations, and alkaline metals and alkaline-earth metals may cause degradation of the device properties.

While levels in purity of the crude cobalt traded globally and presently are about 98% to 99.8%, such crude cobalt contains various impurities, for example, transition metals such as nickel (Ni) iron (Fe), and chromium (Cr), gas elements such as oxygen (O), nitrogen (N), and sulfur (S). Therefore, in order to use cobalt for a semiconductor device, it is necessary to remove these impurities from the crude cobalt and achieve higher purification. Moreover, cobalt appears favorable as material of devices such as magnetic recording mediums or magnetic recording heads, as well as semiconductor devices, because of bearing properties typical of ferromagnetic metals. A higher purification of cobalt is indispensable to the use of cobalt as material of these devices.

Various methods of removing impurities from crude cobalt, for example, wet processing such as solvent extraction, ion exchange, and electrolytic refining for separation of metallic elements, and dryness hydrogen gas ($H_2$) processing for removal of gas elements such as oxygen and nitrogen, and floating zone melting refining method, have been studied.

SUMMARY OF THE INVENTION

However, there is a problem with the solvent extraction. It is difficult to control extraction and reverse extraction and to refine cobalt surely in industrial processes. And, although nearly all of metal impurities can be separated by the ion exchange, copper contents before and after refining by the ion exchange may not change, that is, it is difficult to remove copper, which is a problem with the ion exchange. In addition, there are problems with the electrolytic refining that pH control of electrolytic solutions is required, and it is difficult to remove nickel and copper. And, although the floating zone melting refining method is intended to further raise the purity level of metals purified to some extent, it is reported that the floating zone melting refining method has very few effects on purification of cobalt (V. G. Glebovsky, et al. Materials Letters, 36 (1998), pp. 308-314). Therefore, a need exists for methods of purifying cobalt surely, easily, and highly, and particularly for the development of methods of removing copper.

The present invention has been achieved in view of the above problems. It is an object of the invention to provide high purity cobalt and high purity cobalt targets in which contents of impurities such as copper are reduced.

It is another object of the invention to provide a method of easily and surely manufacturing high purity cobalt.

The invention provides high purity cobalt with 99.99 mass % or more in purity wherein a copper impurity content is 50 mass ppb or less.

In another aspect, the invention provides high purity cobalt wherein a residual resistivity ratio thereof is 150 or more, and a copper impurity content is 50 mass ppb or less.

A method of manufacturing high purity cobalt according to the invention includes the steps of converting divalent copper ions as impurities contained in an aqueous solution of cobalt chloride to monovalent copper ions; adjusting a concentration of hydrochloric acid in a range of 0.1 kmol/m$^3$ to 3 kmol/m$^3$; and separating the monovalent copper ions from the aqueous solution of cobalt chloride by using anion exchange resins.

In another aspect, a method of manufacturing high purity cobalt according to the invention includes the step of heating cobalt chloride or hydrates thereof from 623K to less than 873K in a hydrogen atmosphere in order to obtain cobalt.

The invention provides high purity cobalt targets with 99.99 mass % or more in purity wherein a copper impurity content is 50 mass ppb or less.

In another aspect, the invention provides high purity cobalt targets wherein a residual resistivity ratio is 150 or more, and a copper impurity content is 50 mass ppb or less.

In the high purity cobalt and the high purity cobalt targets according to the invention, concentration of copper is reduced to 50 mass ppb or less to achieve high purification.

The method of manufacturing the high purity cobalt according to the invention includes the steps of converting divalent copper ions to monovalent copper ions, and adjusting a concentration of hydrochloric acid. These steps allow copper to be absorbed on anion exchange resins, and cobalt not to be absorbed thereon. Thus the copper can be separated easily and surely from the aqueous solution of cobalt chloride.

Another method of manufacturing high purity cobalt according to the invention includes the step of heating cobalt chloride or hydrates thereof from 623K to less than 873K in a hydrogen atmosphere in order to obtain high purity cobalt easily and surely.

Other and further objects, features and advantages of the invention will appear more fully from the following description.

BRIEF DESCRIPTION OF THE DRAWINGS

FIG. 2 is a flow chart illustrating the manufacturing process following FIG. 1.

DETAILED DESCRIPTION OF THE PREFERRED EMBODIMENTS

Figure 1:
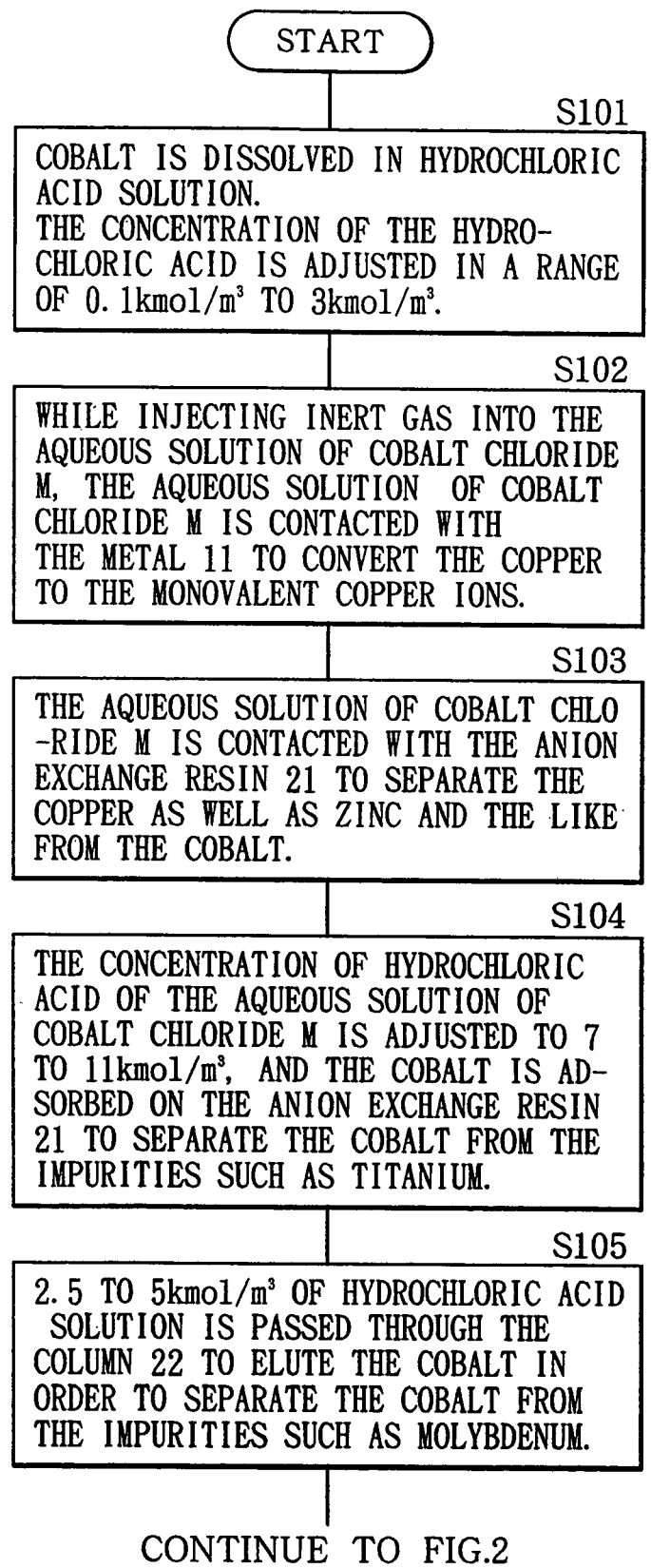
FIG. 1 is a flow chart illustrating a manufacturing process of high purity cobalt and high purity cobalt targets according to one embodiment of the invention.

An embodiment of the present invention will be described in detail below with reference to the accompanying drawings.

In accordance with one embodiment of the invention, high purity cobalt and high purity cobalt targets have 99.99 mass % or more in purity, or the residual resistivity ratios thereof are 150 or more and copper impurity contents thereof are 50 mass ppb or less.

The term "purity" (namely, chemical purity) used herein means values obtained by one minus all concentrations of impurities possible to be determined by using present analysis apparatus and methods (Minoru Isshiki, Koji Mimura, Bulletin of the Japan Institute of Metals, 31 (1992), 880-887). For example, the values can be obtained by one minus the concentrations of impurities of 70 or more elements determined by Glow Discharge Mass Spectroscopy. The concentrations of gas elements such as oxygen, nitrogen, and hydrogen, if required, can be determined by appropriate methods such as a non-dispersive infrared absorption method, a thermal conductivity method, and a heat conduction measurement of such gas elements separated with a column after being fused in an inert gas.

Residual resistivity ratios provide one index showing purities of high purified metals and as shown in the formula I, the residual resistivity ratio is the ratio of resistivity at 298 K to resistivity at 4.2 K. The formula II shows a relationship between resistivity and resistance (electric resistance). Therefore, the formula I expressing the residual resistivity ratio can be transformed into the formula III, and if volume changes by temperature are negligible, the formula I can be approximated by the ratio of the resistance at 298 K to the resistance at 4.2 K. It should be noted that cobalt is a ferromagnetic metal and factors such as, geomagnetism, demagnetization conditions, and magnetic fields by measurement currents can affect the resistance measurements. Thus, it is necessary to apply vertical magnetic field which is preferably about 60 kA/m in measuring the resistance in order to suppress these influences (Seiichi Takagi, Materia Japan, 33 (1994), 6-10).

$$RRR = \rho_{298\,K}/\rho_{4.2\,K} \qquad (I)$$

RRR; residual resistivity ratio
$\rho_{298\,K}$; resistivity at 298 K ($\Omega$m)
$\rho_{4.2\,K}$; resistivity at 4.2 K ($\Omega$m)

$$\rho = R \times (S/L) \qquad (II)$$

$\rho$; resistivity ($\Omega$m)
R; resistance ($\Omega$)
S; cross-section area perpendicular to the direction of current (m$^2$)
L; length (m)

$$RRR = \frac{R_{298K} \times \frac{S_{298K}}{L_{298K}}}{R_{4.2K} \times \frac{S_{4.2K}}{L_{4.2K}}} \approx \frac{R_{298K}}{R_{4.2K}} \qquad (III)$$

RRR; residual resistivity ratio $R_{298\,K}$, $S_{298\,K}$, and $L_{298\,K}$; respectively, resistance, cross-section area, length at 298 K $R_{4.2\,K}$, $S_{4.2\,K}$, and $L_{4.2\,K}$; respectively resistance, cross-section area, length at 4.2 K The high purity cobalt and the high purity cobalt targets may be used as materials of devices, for example, semiconductor devices, magnetic recording mediums, magnetic recording heads, and devices with environmental semiconductors. The term "environmental semiconductor" used herein means a semiconductor substance that exists abundantly on the earth and consists of an eco-friendly material, for example, iron silicide (FeSi$_2$) and calcium silicide (Ca$_2$Si) (See the website of Society of Kankyo Semiconductors (http ://kan.engjm.saitama-u.ac.jp/SKS/index2.html)).

Such high purity cobalt and such high purity cobalt targets can be manufactured as follows.

FIGS. 1 and 2 show the manufacturing process of the high purity cobalt according to the embodiment. First, the cobalt containing impurities such as copper is dissolved in a hydrochloric acid solution in order to prepare an aqueous solution of cobalt chloride (CoCl$_2$) (Step S101). The concentration of the hydrochloric acid is adjusted in a range of 0.1 kmol/m$^3$ to 3 kmol/m$^3$.

Figure 3:
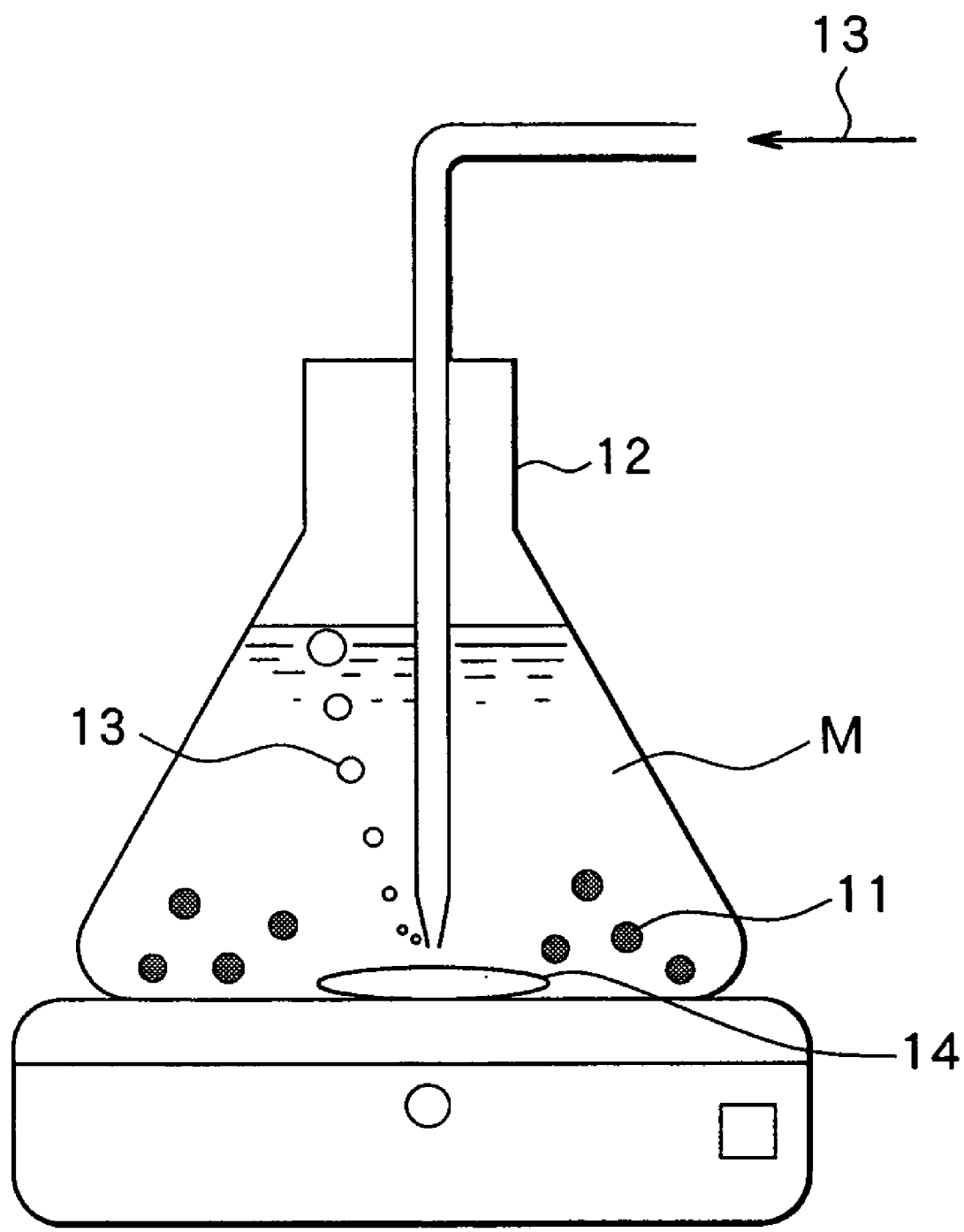
FIG. 3 is a diagram explaining one step of the manufacturing process shown in FIG. 1.

As shown in FIG. 3, the aqueous solution of cobalt chloride M is poured into a container 12 with a metal 11 such as cobalt. Then, the aqueous solution of cobalt chloride M is sufficiently contacted with the metal 11 by agitating with a device such as a stirrer 14, while injecting an inert gas 13 such as nitrogen gas (N$_2$) or argon gas (Ar) into the aqueous solution M (Step S102). Thus, the copper contained in the aqueous solution of cobalt chloride M will react with the metal 11, converting the divalent copper ions to monovalent copper ions. The following chemical formula 1 shows an example of the reaction.

$$2[CuCl_2]^0 + Co(solid) \rightarrow Co^{2+} + 2[CuCl_2]^- \qquad (1)$$

Dissolved oxygen can prevent reactions such as the above chemical formula 1. Therefore, injecting the inert gas 13 into the aqueous solution of cobalt chloride M intends to remove oxygen dissolved in the aqueous solution of cobalt chloride M, in order to carry out the reaction. The inert gas 13 may be injected with agitating the aqueous solution of cobalt chloride M containing the metal 11, or before the metal 11 is added into the aqueous solution of cobalt chloride M.

Preferably, the metal 11 has large surface area such as powder, which can contact more effectively with the aqueous solution of cobalt chloride M and react sufficiently with the copper. Substances other than cobalt can also be used for the metal 11. It is preferred to use cobalt for the metal 11 in order to avoid other impurities from contaminating the aqueous solution of cobalt chloride M as much as possible.

The divalent copper ions in the aqueous solution of cobalt chloride M may be converted to the monovalent copper ions by contacting with the metal 11 after adjusting the concentration of hydrochloric acid in the aqueous solution of cobalt chloride M as described above, or before adjusting the concentration of hydrochloric acid in the aqueous solution of cobalt chloride.

Figure 4:
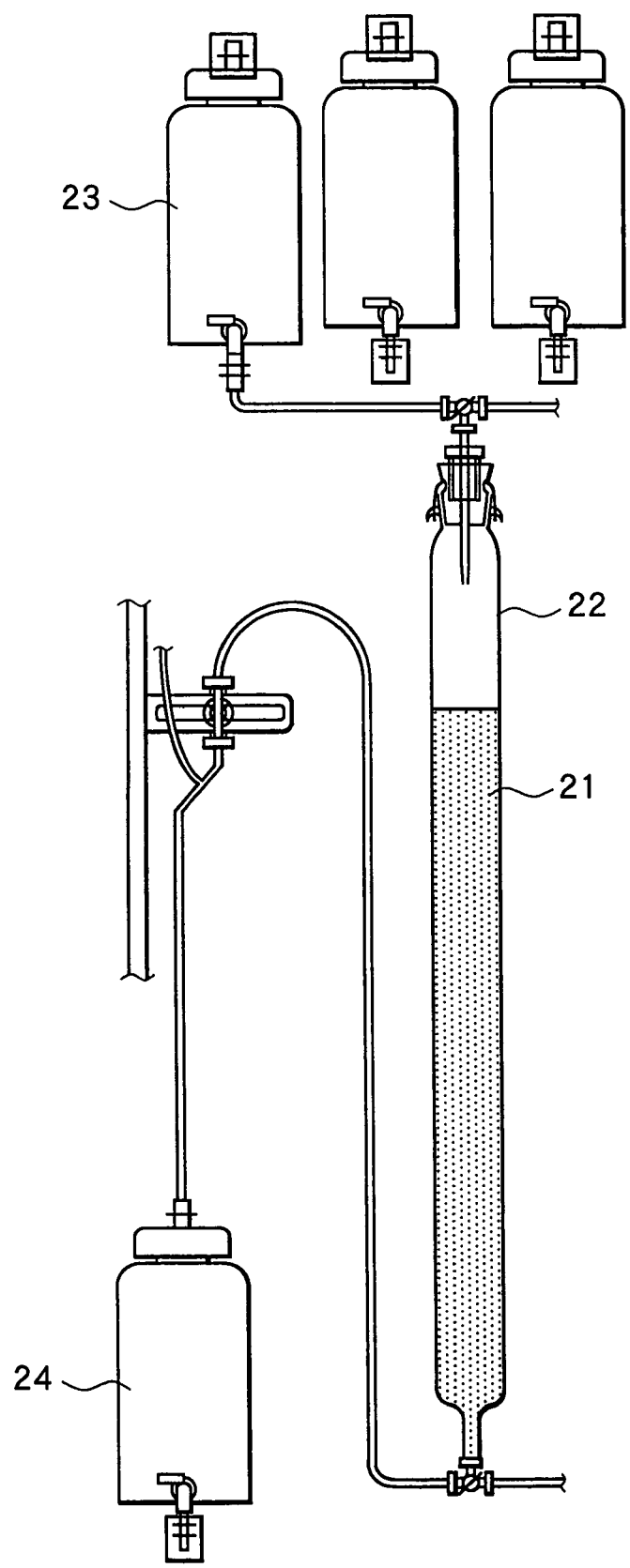
FIG. 4 is a diagram explaining another step of the manufacturing processes shown in FIG. 1.
Figure 5:
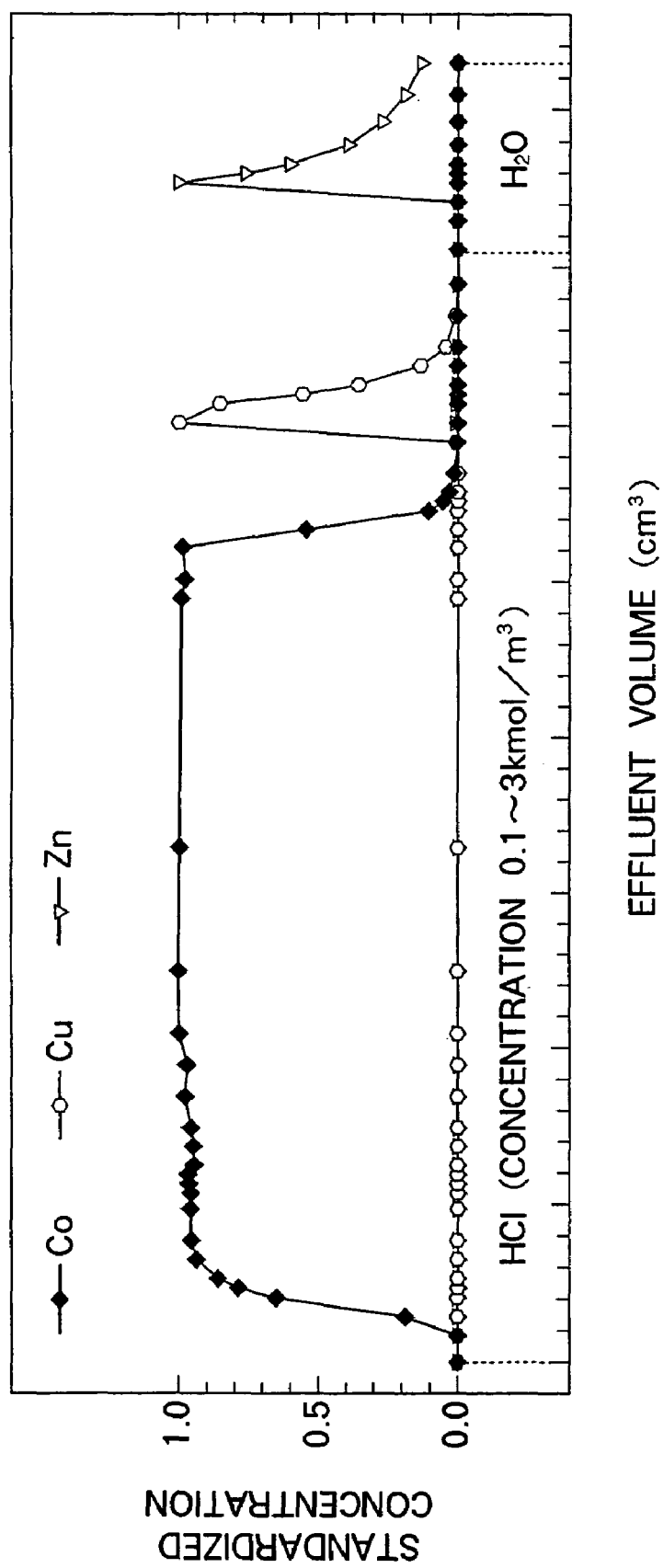
FIG. 5 is a graph illustrating changes of the concentrations of metal ions in the liquid eluted from the column filled up with the anion exchange resins.

Then, as shown in FIG. 4, a column 22 is filled up with anion exchange resins 21, the aqueous solution of cobalt chloride M is fed into the column 22 from a storage tank 23, and is contacted with the anion exchange resins 21 sufficiently (Step S103). The flow rate of the aqueous solution of cobalt chloride M is determined effectively to contact the aqueous solution of cobalt chloride M with the anion exchange resins 21 sufficiently, and is preferably 1 bed volume(s)/hour. The monovalent copper ions will be absorbed on the anion exchange resins 21, and the cobalt will be eluted from the column 22 without being completely absorbed on the anion exchange resins 21. FIG. 5 shows changes of the concentrations of metal ions in the effluent (elution curve). In FIG. 5, the abscissa represents the effluent volumes and the ordinate represents the concentrations standardized by the maximum concentrations of the metal ions. As shown in FIG. 5, there is no range to which the peaks of the elution curves of the divalent cobalt ions and the monovalent copper ions overlap, which shows that the copper can be completely separated from the aqueous solution of cobalt chloride. That is, the aqueous solution of cobalt chloride M from which copper is separated is collected into a recovery tank 24.

In addition, when impurities such as zinc (Zn) are contained in the aqueous solution of cobalt chloride M, as shown in FIG. 5, in the Step S103, the zinc as well as the copper will be absorbed on the anion exchange resins 21, and the zinc can be also separated from the aqueous solution of cobalt chloride M. Elements separated like zinc include, for example, technetium (Te), ruthenium (Ru), palladium (Pd), silver (Ag), cadmium (Cd), indium (In), tin (Sn), rhenium (Re), osmium (Os), iridium (Ir), platinum (Pt), gold (Au), mercury (Hg), thallium (Tl), lead (Pb), bismuth (Bi), and polonium (Po). That is, when at least one of such impurities is contained in the aqueous solution of cobalt chloride M, the impurities can be separated as well as the copper.

When at least one of impurities selected from the group consisting of Titanium (Ti), chromium (Cr), manganese (Mn), nickel (nickel), aluminum (aluminum), alkaline metals, and alkaline-earth metals is contained in the aqueous solution of cobalt chloride M after separating the copper, the concentration of hydrochloric acid of the aqueous solution of cobalt chloride M is adjusted in the range of 7 kmol/m³ to 11 kmol/m³ and, as shown in FIG. 4, the aqueous solution of cobalt chloride M is sufficiently contacted on the anion exchange resins 21 (Step S104). Thus, the cobalt will be absorbed on the anion exchange resins 21, and the impurities such as titanium, chromium, manganese, nickel, aluminum, alkaline metals, and alkaline-earth metals will not be absorbed on the anion exchange resins 21 and will be separated from the cobalt.

Moreover, when at least one of impurities selected from the group consisting of iron, zinc, molybdenum (Mo), technetium, ruthenium, palladium, silver, cadmium, indium, tin, tungsten (W), rhenium, osmium, iridium, platinum, gold, mercury, thallium, lead, bismuth, and polonium is contained in the aqueous solution of cobalt chloride M, such impurities can be absorbed on the anion exchange resins 21 as well as the cobalt in the Step S104. In such a case, after absorbing the cobalt on the anion exchange resins 21, 2.5 kmol/m³ to 5 kmol/m³ of hydrochloric acid solution is passed through the column 22 to elute the cobalt from the anion exchange resins 21 and separate the cobalt from the impurities absorbed on the anion exchange resins 21 such as iron, zinc, molybdenum, technetium, ruthenium, palladium, silver, cadmium, indium, tin, tungsten, rhenium, osmium, iridium, platinum, gold, mercury, thallium, lead, bismuth, and polonium (Step S105).

It should be noted that iron, molybdenum, and tungsten will be mainly separated from the cobalt in the Step S105, because zinc, technetium, ruthenium, palladium, silver, cadmium, indium, tin, rhenium, osmium, iridium, platinum, gold, mercury, thallium, lead, bismuth, and polonium have already been separated from the aqueous solution of cobalt chloride M with the copper in the Step S103.

Figure 6:
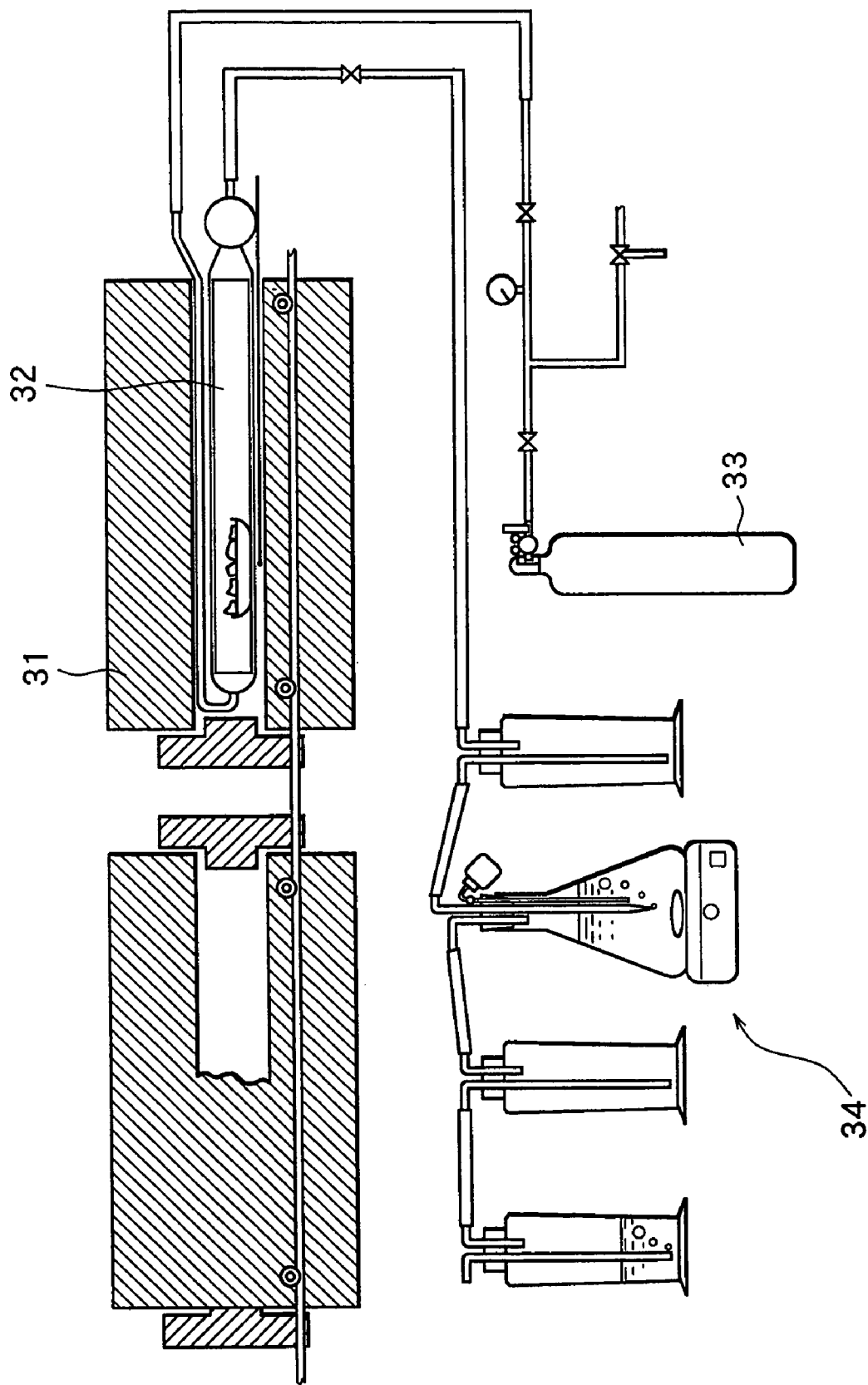
FIG. 6 is a diagram explaining one step of the manufacturing processes shown in FIG. 2.

After eluting the cobalt, the obtained aqueous solution of cobalt chloride M is evaporated to dryness to obtain cobalt chloride or hydrates thereof (Step S106). Then, the obtained cobalt chloride or hydrates thereof are heated to 623 K to less than 873 K (350° C. to less than 600° C.) in a hydrogen atmosphere by using an equipment as shown in FIG. 6 (Step S107). Thus, the cobalt chloride or hydrates thereof will react as shown in the chemical formula 2 to obtain cobalt. The equipment shown in FIG. 6 includes a heating furnace 31 and a reaction pipe 32 located within the heating furnace 31. Hydrogen gas 33 is supplied through a first end part of the reaction pipe 32, and hydrogen chloride gas generated by the reaction is discharged through a second end part. The discharged gas is send to a processing part 34.

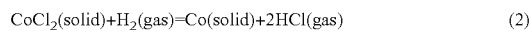

$$CoCl_2(solid) + H_2(gas) = Co(solid) + 2HCl(gas) \quad (2)$$

Figure 7:
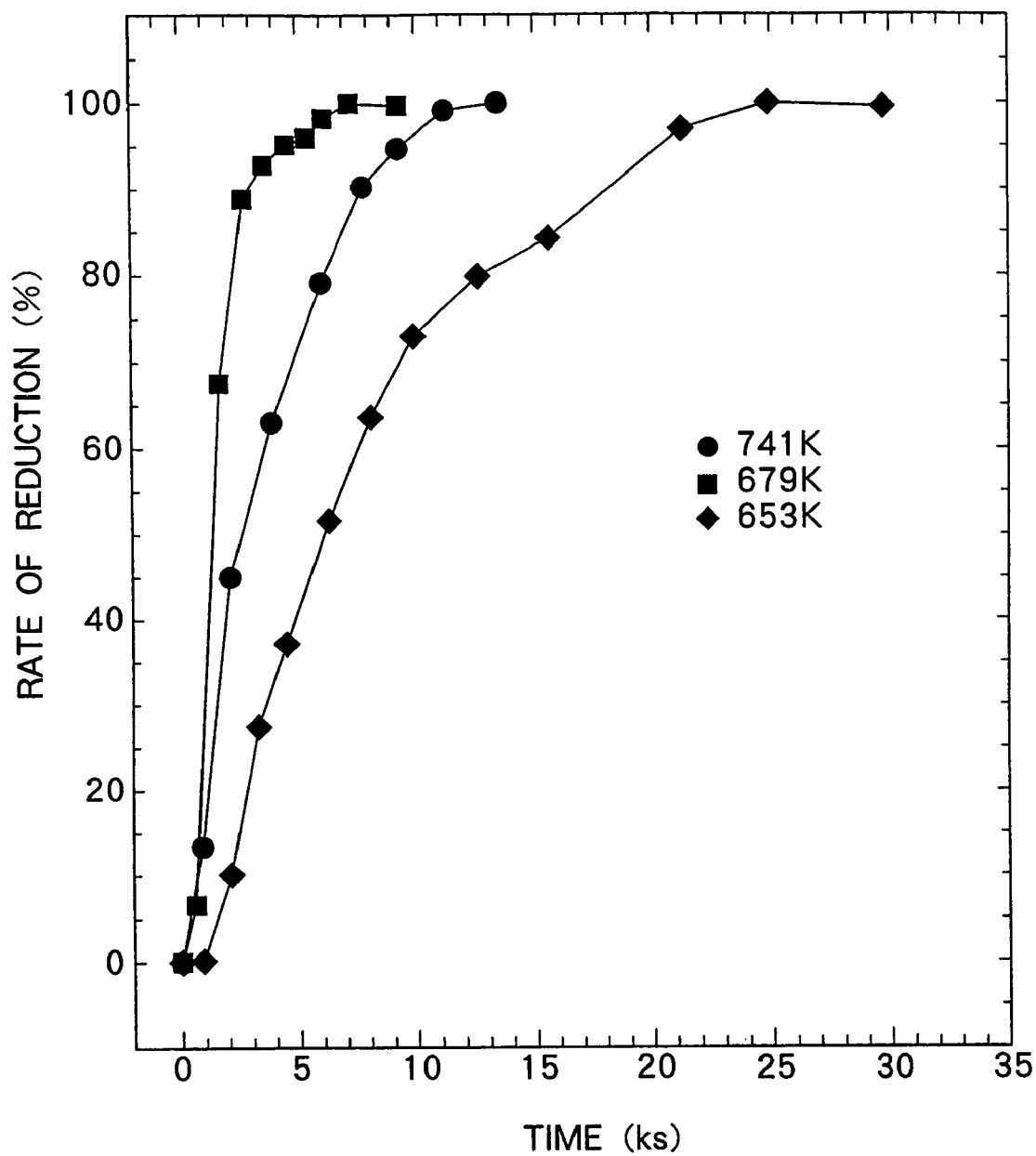
FIG. 7 is a graph illustrating the relationship between the heating temperature of cobalt chloride and the reaction rate.

Less than 623 K cobalt chloride cannot react sufficiently, and the reactions at 873 K and above may increase the cost and require complicated equiptments. Thus, it is preferred in a range of 623 k to less than 873 K in order to react the cobalt chloride sufficiently. FIG. 7 shows the relationship between the heating temperature and the reaction rate (reduction rate). In FIG. 7, the abscissas represent times and the ordinates represent rates of reduction. The rates of reduction are obtained by concentration changes of the collected hydrogen chloride based on the theory that 2 moles of hydrogen chloride are generated by reduction of 1 mole of cobalt as shown in the chemical formula 2. FIG. 7 also shows that the cobalt can sufficiently be reduced at 623 K to less than 873 K.

After reacting of the cobalt chloride, the obtained cobalt is molten with plasma arc using a plasma generation gas containing active hydrogen, in order to remove at least one of impurities selected from the group consisting of oxygen, nitrogen, carbon (C), sulfur, halogen, alkaline metals, and alkaline-earth metals (Step S108). Thus, the steps described above can provide the high purity cobalt and the high purity cobalt targets according to the embodiment.

Further, the high purity cobalt and the high purity cobalt targets according to the embodiment may be obtained by the following procedure for separating impurities from the aqueous solution of cobalt chloride M.

First, while injecting the inert gas into the aqueous solution of cobalt chloride M, the aqueous solution of cobalt chloride M is contacted with the metal 11 to convert the divalent copper ions to the monovalent copper ions (Step S102). Then, the concentration of hydrochloric acid of the aqueous solution of cobalt chloride M is adjusted from 7 kmol/m³ to 11 kmol/m³, and the cobalt is contacted with the anion exchange resins 21 to absorb the cobalt thereon and separate the cobalt from the impurities such as titanium (Step S104). Then, to separate the cobalt from the impurities such as molybdenum absorbed on the anion exchange resins 21, 2.5 kmol/m³ to 5 kmol/m³ of hydrochloric acid solution is passed through the column 22 to elute the cobalt from the anion exchange resins 21 (Step S105). And then, the concentration of hydrochloric acid of the aqueous solution of cobalt chloride M is adjusted from 0.1 kmol/m$^3$ to 3 kmol/m$^3$ (Step S101), and the aqueous solution of cobalt chloride M is contacted with the anion exchange resins 21 to absorb the copper and separate the copper from the aqueous solution of cobalt chloride M (Step S103).

In addition, after converting the divalent copper ions to the monovalent copper ions (Step S102), the following procedure may be performed, that is, adjusting the concentration of hydrochloric acid of the aqueous solution of cobalt chloride M, contacting the aqueous solution of cobalt chloride M with the anion exchange resins 21 to absorb the cobalt thereon to separate the impurities such as titanium (Step S104), eluting the cobalt from the column filled up with the anion exchange resins 21 with a 0.1 kmol/m$^3$ to 3 kmol/m$^3$ of hydrochloric acid solution to separate the cobalt with the impurities such as copper absorbed on the anion exchange resins 21, adjusting the concentration of hydrochloric acid of the aqueous solution of cobalt chloride M from 2.5 kmol/m$^3$ to 5 kmol/m$^3$, contacting the aqueous solution of cobalt chloride M with the anion exchange resins 21 to absorb the impurities such as iron, molybdenum, and tungsten to separate the impurities from the aqueous solution of cobalt chloride M.

In addition, the concentration of the hydrochloric acid solution for eluting the cobalt absorbed on the anion exchange resins 21 may be adjust from 2.5 kmol/m$^3$ to 3 kmol/m$^3$ to separate the impurities such as iron, molybdenum, and tungsten as well as the copper.

Furthermore, the following procedure may be performed, that is, adjusting the concentration of hydrochloric acid of the aqueous solution of cobalt chloride M, contacting the aqueous solution of cobalt chloride M with the anion exchange resins 21 to absorb the cobalt to separate the impurities such as titanium (Step S104), eluting the cobalt from the column filled up with the anion exchange resins 21 with the adjusted concentration of hydrochloride acid solution to separate impurities such as molybdenum (Step S105), converting the divalent copper ions to the monovalent copper ions (Step S102), adjusting the concentration of the aqueous solution of cobalt chloride M, and contacting the aqueous solution of cobalt chloride M with the anion exchange resins 21 to absorb and separate the copper (Step S103). It should be noted that impurities may be contaminated in the converting step. The procedures other than the latest procedure are preferred.

As described above, in the high purity cobalt and the high purity cobalt targets according to the invention, the contents of copper may be reduced to 50 mass ppb or less. Therefore, the high purity cobalt or the cobalt targets according to the invention may not be responsible for short circuit of devices such as semiconductor devices and can be applied to the semiconductor devices for the enhancement of properties. Moreover, the high purity cobalt and the high purity cobalt targets can use for devices such as magnetic recording mediums, magnetic recording heads, devices using environmental semiconductor, and the like for the enhancement of properties.

Moreover, according to the method of manufacturing the high purity cobalt, the divalent copper ions is converted to the monovalent copper ions and the concentrations of the hydrochloric acid are adjusted from 0.1 kmol/m$^3$ to 3 kmol/m$^3$. Therefore, the copper may be absorbed on the anion exchange resins and be separated from the aqueous solution of cobalt chloride easily and the high purity cobalt and the high purity cobalt targets with low concentrations of copper can be obtained easily and surely.

Furthermore, cobalt chloride or hydrates thereof are heated to the temperature of 623 K to less than 873K in a hydrogen atmosphere, and the cobalt can be easily and surely obtained at low temperature. Therefore, the embodiment provides a lower processing cost and compact manufacturing equiptments.

The invention will be further described in detail by reference to FIGS. 1 to 6. In the following examples, the same reference numbers and signs will be used for equivalents of the substances in the above embodiments.

EXAMPLE

First, in order to prepare an aqueous solution of cobalt chloride M, scrap cobalt used as a material was dissolved into 1.5 kmol/m$^3$ of hydrochloric acid solution until the concentration of the cobalt reached 0.34 kmol/m$^3$ (20 g/dm$^3$) (Step S101). Then, powdered cobalt 11 was added to the aqueous solution of cobalt chloride M, and inert gas was injected into the solution M with agitating, as shown in FIG. 3, to convert divalent copper ions to monovalent copper ions (Step S102). Then, as shown in FIG. 4, the aqueous solution of cobalt chloride M was contacted with anion exchange resins 21 to absorb the copper and separate the copper from the aqueous solution of cobalt chloride M (Step S103).

After separating the copper, the concentration of hydrochloric acid of the aqueous solution of cobalt chloride M was adjusted to 9 kmol/m$^3$, and the aqueous solution of cobalt chloride M was contacted with the anion exchange resins 21 to absorb the cobalt and separate impurities such as titanium (Step S104). Then, the cobalt was eluted from the column filled up with the anion exchange resins 21 with 4 kmol/m$^3$ of hydrochloric acid solution to separate impurities such as molybdenum (Step S105).

Figure 8:
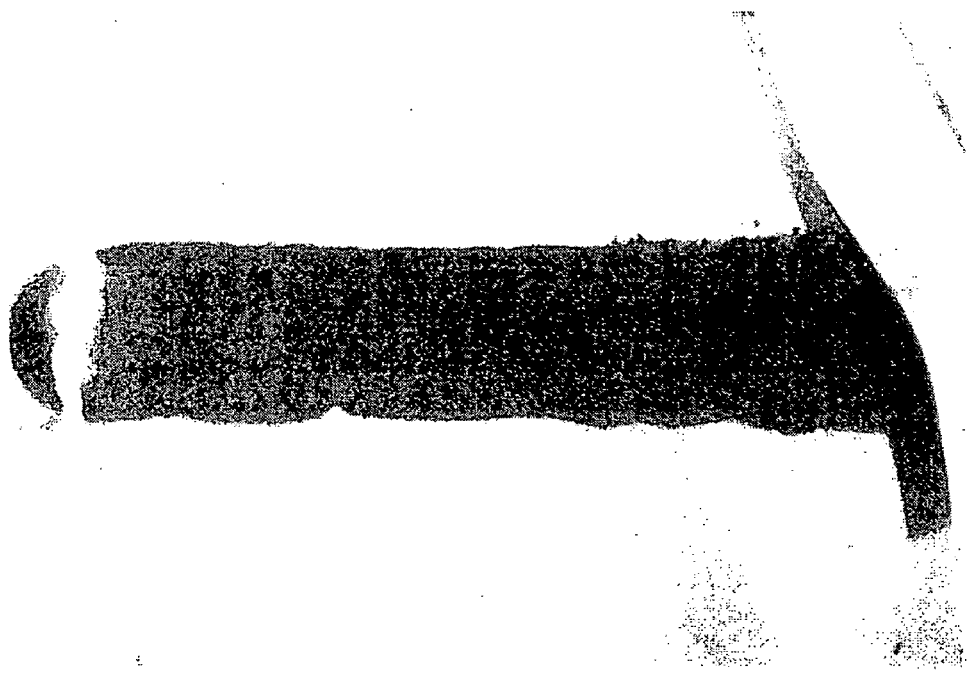
FIG. 8 is a photograph of the cobalt particles obtained in the example of the invention.

After eluting the cobalt from the column filled up with the anion exchange resins 21, the obtained aqueous solution of cobalt chloride M was evaporated to dryness to obtain cobalt chloride or hydrates thereof (Step S106). And, as shown in FIG. 6, the obtained cobalt chloride or hydrates thereof were heated to 743 K in a hydrogen atmosphere to obtain cobalt (Step S107). FIG. 8 shows a photograph of cobalt particles obtained in the Step S107. The cobalt was sponge-like rather than powdered as shown in FIG. 8. The cobalt obtained in the Step S107 was molten with plasma arc containing active hydrogen to remove impurities such as oxygen (Step S108) to obtain high purity cobalt.

Quantities of purities contained in the obtained high purity cobalt were determined by Glow Discharge Mass Spectroscopy and residual resistivity ratio was calculated. Table 1 shows the results. As shown in Table 1, the copper concentration was as very low as 50 mass ppb or less, and the value of purity was as very high as 99.9997%, and the residual resistivity ratio was as very high as 207.

TABLE 1

| | Element | Concentration (mass ppm) | Element | Concentration (mass ppm) | Element | Concentration (mass ppm) |
|---|---|---|---|---|---|---|
| Concentration of impurities | Al | 0.035 | Fe | 0.570 | Rh | <0.010 |
| | As | 0.700 | Ga | <0.020 | Ru | 0.020 |
| | B | <0.010 | Hf | 0.010 | Sb | <0.020 |
| | Ba | <0.010 | In | 0.005 | Si | <0.010 |
| | Be | <0.010 | K | 0.010 | Sn | 0.050 |

TABLE 1-continued

|  | Element | Concentration (mass ppm) | Element | Concentration (mass ppm) | Element | Concentration (mass ppm) |
|---|---|---|---|---|---|---|
|  | Bi | <0.010 | Li | <0.010 | Th | 0.001 |
|  | Ca | 0.045 | Mg | <0.010 | Ti | <0.010 |
|  | Cd | <0.050 | Mn | <0.010 | U | 0.002 |
|  | Cl | <0.050 | Mo | <0.050 | V | 0.080 |
|  | Cr | 0.026 | Na | <0.010 | Zn | <0.050 |
|  | Cu | 0.045 | Ni | 0.720 | Zr | <0.010 |
|  | F | <0.050 | P | <0.050 | Pb | <0.010 |
| Purity |  |  | 99.9997% |  |  |  |
| Residual resistivity ratio |  |  | 207 |  |  |  |

It is found that due to converting divalent copper ions to monovalent copper ions and adjusting the concentration of hydrochloric acid from 0.1 kmol/m$^3$ to 3 kmol/m$^3$, copper could be easily separated from the aqueous solution of cobalt chloride, and the high purity cobalt having the concentration of copper reduced to 50 mass ppb or less could be obtained easily.

As described above, the invention is explained by the embodiments and examples. These embodiments and examples are not meant to limit the scope of the invention and variations within the concepts of the invention are apparent. For example, the heating temperature of cobalt chloride or hydrates thereof in a hydrogen atmosphere for generating cobalt may be 623 K to less than 873K as described in the above embodiments and examples, or may be 873K or more.

Moreover, impurities other than copper may be removed by the methods as described in the above embodiments and example, or by other conventional methods.

Furthermore, the method of generating cobalt by heating cobalt chloride or hydrates thereof from 623 K to less than 873K in a hydrogen atmosphere is applicable to other methods of separating the impurities from the aqueous solution of cobalt chloride as well as the methods as described in the above embodiments and examples.

As described above, in the high purity cobalt and the high purity cobalt targets according to the invention, the contents of copper that causes influences such as a short circuit may be reduced to 50 mass ppb or less. Therefore, the high purity cobalt or the high purity cobalt targets according to the invention applied to semiconductor devices may not be responsible for short circuit of semiconductor devices and can provide the enhancement of properties of the semiconductor devices. Moreover, the high purity cobalt and the high purity cobalt targets can be used for devices such as magnetic recording mediums, magnetic recording heads, devices using environmental semiconductor and the like for the enhancement of properties.

Moreover, according to the method of manufacturing the high purity cobalt of the invention, the divalent copper ions are converted to the monovalent copper ions and the concentration of the hydrochloric acid is adjusted from 0.1 kmol/m$^3$ to 3 kmol/m$^3$. Therefore, the copper may be absorbed on the anion exchange resins and be separated from the aqueous solution of cobalt chloride easily. In addition, the high purity cobalt and the high purity cobalt targets with low concentration of copper can be obtained easily and surely.

Furthermore, according to the invention, cobalt chloride or hydrates thereof are heated to the temperature of 623 K to less than 873K in hydrogen atmosphere, and the cobalt can be easily and surely obtained at low temperature. Therefore, the invention provides a lower processing cost and compact manufacturing equiptments.

Obviously many modifications and variation of the present invention are possible in the light of the above teachings. It is therefore to be understood that within the scope of the appended claims the invention may be practiced otherwise than as specifically described.

What is claimed is:

1. A method of manufacturing high purity cobalt comprising the steps of:
   converting divalent copper ions as impurities contained in an aqueous solution of cobalt chloride to monovalent copper ions, wherein the converting step comprises injecting an inert gas into the aqueous solution of cobalt chloride and contacting the aqueous solution of cobalt chloride with elemental cobalt;
   adjusting a concentration of hydrochloric acid in a range of 0.1 kmol/m$^3$ to 3 kmol/m$^3$; and
   separating the monovalent copper ions from the aqueous solution of cobalt chloride by using anion exchange resins.

2. A method of manufacturing high purity cobalt according to claim 1, comprising the steps of;
   converting divalent copper ions as impurities contained in the aqueous solution of cobalt chloride to monovalent copper ions;
   adjusting a concentration of hydrochloric acid in the aqueous solution of cobalt chloride in a range of 0.1 kmol/m$^3$ to 3 kmol/m$^3$; and
   separating the monovalent copper ions from the aqueous solution of cobalt chloride by using the anion exchange resins after the steps of converting the divalent copper ions to the monovalent copper ions and adjusting the concentration of hydrochloric acid.

3. A method of manufacturing high purity cobalt according to claim 1, wherein impurities of at least one selected from the group consisting of zinc, technetium, ruthenium, palladium, silver, cadmium, indium, tin, rhenium, osmium, iridium, platinum, gold, mercury, thallium, lead, bismuth, and polonium are separated from the aqueous solution of cobalt chloride in the step of separating the monovalent copper ions.

4. A method of manufacturing high purity cobalt according to claim 1, further comprising the steps of:
   obtaining cobalt chloride or hydrates thereof from the aqueous solution of cobalt chloride which the impure copper is separated therefrom; and
   heating the cobalt chloride or the hydrates thereof from 623 K to less than 873 K in a hydrogen atmosphere to obtain cobalt.

5. A method of manufacturing high purity cobalt according to claim 4, further comprising the step of melting the cobalt obtained in the heating step with plasma arc using a plasma generation gas containing active hydrogen in order to remove impurities of at least one selected from the group consisting of oxygen, nitrogen, carbon, sulfur, halogen, alkaline metals, and alkaline-earth metals.

* * * * *